United States Patent [11] 3,617,389

| [72] | Inventors | Wolfgang Kuhn<br>Frankfurt am Main;<br>Werner Lindner, Niederhochstadt, Tounus;<br>Gerd Sandstede, Frankfurt am Main, all of<br>Germany |
|------|-----------|-----|
| [21] | Appl. No. | 732,819 |
| [22] | Filed | May 29, 1968 |
| [45] | Patented | Nov. 2, 1971 |
| [73] | Assignee | Robert Bosch G.m.b.H.<br>Stuttgart, Germany |

[54] PREPARATION OF RANEY CATALYST FUEL CELL ELECTRODES
6 Claims, No Drawings

[52] U.S. Cl. .................................................136/120 FC, 75/201, 75/222
[51] Int. Cl. .................................................H01m13/04, B22f 3/24
[50] Field of Search .................................... 136/120 FC, 201, 222; 75/200, 201, 222, 224

[56] References Cited
UNITED STATES PATENTS

| 3,177,077 | 4/1965 | Eyraud et al. | 75/201 |
| 3,341,936 | 9/1967 | Sanstede et al. | 136/86 X |
| 3,350,200 | 10/1967 | Sandstede et al. | 136/86 X |
| 3,382,067 | 5/1968 | Sandstede et al. | 136/120 X |
| 3,409,474 | 11/1968 | Jung et al. | 136/120 |
| 3,481,789 | 12/1969 | Winsel | 136/86 |
| 3,442,715 | 5/1969 | Wung Dai Yee et al. | 136/122 |

OTHER REFERENCES

Lange, Handbook of Chemistry, 9th Ed., 1956, pp. 302 and 303, relied on.

*Primary Examiner*—Winston A. Douglas
*Assistant Examiner*—M. J. Andrews
*Attorneys*—Fritz G. Hochwald and Christen & Sabol ABSTRACT: In the preparation of Raney alloy fuel cell electrodes using polytetrafluoroethylene as a binder, harmful reaction of the binder with the aluminum or other reactive metal of the Raney alloy is prevented by the presence of finely powdered silver salts which envelop and protect the Raney alloy particles and develop a protecting gas at the sintering temperature of the polytetrafluoroethylene.

PREPARATION OF RANEY CATALYST FUEL CELL ELECTRODES

The invention relates to fuel cell electrodes and to methods for their preparation. More particularly, the invention relates to a method for preparing such electrodes from Raney alloys and plastics of the type of polytetrafluoroethylene (PTFE).

Hereinafter, the term "Raney alloy" will be used for metal alloys which consist of one or more chemically relatively stable metals, useful as catalysts, and a relatively readily attackable metal, such as aluminum, zinc, or the like which can be dissolved out of the alloy by means of bases or acids, leaving a very finely divided residue of the first named stable metal. Said residue is called "Raney catalyst" (see U.S. Pat. No. 1,563,587).

The use of such Raney catalysts in fuel cells has long been known (German Pat. Nos. 1,071,789 and 1,235,834). It has also been known to employ plastics as matrix and to embed therein only a small amount of catalyst so as to obtain very light electrodes (German Pat. Pub. Nos. 1,219,105 and 1,183,149). In addition to polyethylene and polyvinyl chloride, the use of PTFE has been preferred due to its thermal stability and particularly high corrosion resistance (U.S. Pat. No. 3,274,031). Particularly in the preparation of hydrophobic electrodes, which are coated with a back layer of PTFE, it is of advantage to use PTFE also in the catalyst containing layer because in this case the layers are then joined in a particularly stable manner. Thereby, it is a drawback that the temperatures required to sinter the PTFE, many finely divided substances easily react with the fluorine of the PTFE; this may give rise to violent explosions. In attempts to combine the recited advantages of the PTFE with the good properties of the Raney alloys, it was found that Raney alloys, due to their content of aluminum or other very reactive metals, such as zinc or calcium, can react violently with PTFE.

In the German Pat. No. 1,183,149 it had been stated that polytetrafluoroethylene were suitable for the preparation of electrodes by sintering plastics with a Raney alloy. However, many tests with various such alloys have shown that particularly with very fine particle sizes (e.g. <25 $\mu$m.) frequently strongly exothermic reactions take place as soon as the mixtures are heated. It depends probably on the geometry of the test arrangement whether the generated heat is carried off at such a rate that only a slight superficial reaction of the catalyst takes place. In the preparation of commercially useful electrodes, which have surfaces of the order of magnitude of 100 cm.$^2$ or more for a thickness of about 1 mm., heat accumulates which, in turn, accelerates the reaction until, in the end, an explosive combustion of the electrode disc may take place. Even in a less violent reaction, decomposition products escape which in the preparation of gas electrodes with PTFE back layer (see e.g. below examples 1 and 3) render said back layer wettable for water, thereby making the electrode useless.

The above statements are supported by the following observations, where all percentage values are given by volume:

a. 25% $Pd_{0.6}Ag_{0.4}Al_2$ alloy +25% silver powder +25% PTFE powder +25% sodium chloride, pressed, and heated in a nitrogen atmosphere, react explosively;

b. 15% $Pd_{0.6}Ag_{0.4}Al_3$ alloy +25% carbonyl nickel +25% PTFE powder +40% sodium chloride, pressed, and heated in a nitrogen atmosphere, give a lively reaction;

c. 30% of alloy $Pd_{0.2}Ni_{0.8}Al_3$+30% of graphite powder +25% of PTFE powder +15% of sodium chloride, pressed, and heated in an argon atmosphere, react explosively;

d. 30% of the alloy $Pd_{0.1}Ni_{0.9}Al_3$+20% of carbonyl nickel +25% of PTFE powder +25% of sodium chloride, pressed, and heated in hydrogen atmosphere, react with smoke development;

e. 35% of the alloy $PtAl_3$+30% of vanadium carbide +20% of PTFE powder +15% of sodium chloride, pressed, and heated in air at 370° C.; the mixture carbonized (reaction not observed);

f. 50% of the alloy $Ni_2Al_5$+50% of PTFE powder, pressed, and heated in air, reacts with flame formation.

If activated Raney catalysts are used, i.e., catalyst from which excess aluminum has been removed by dissolving it in a base or acid, the above mentioned vigorous reaction does not take place; this shows that the aluminum of the alloy was the main reactant. On the other hand, it was found that said catalysts generally loose their activity in the required sintering process, be it by recrystallizations at the temperature of about 350° C. or also by the action of the fluorine containing gases developed on heating the PTFE.

The problem, therefore, consisted in looking for a process which would allow heating of Raney alloys together with PTFE to sintering without having the aluminum or other very reactive material react with the PTFE; when this problem is solved, it would be only necessary to treat the sintered and cooled electrode matrix with a base to dissolve the aluminum or other metal so as to produce an active Raney catalyst electrode. In addition, such process must result in electrically conductive bodies as only such bodies are useful as electrodes.

We have found that said problem can be solved by addition of certain silver salts to the mixture of PTFE powder and Raney alloy. Said silver salts must be able to be reduced to a very finely powdered form and must evolve gases when heated at sintering temperature. Suitable such salts are, e.g., silver oxalate, silver oxide, and preferably silver carbonate. The volume proportion of silver salt should be at least as large as that of the Raney alloy in order to prevent the undesired reaction discussed hereinabove. "The silver salt used is decomposed at a temperature not exceeding the sintering temperature of the polytetrafluoroethylene."

We assume that the finely powdered silver salts (particle size below 10 $\mu$m.) envelop the particles of the Raney alloy and protect the same, in addition, by a current of developing gases such as $CO_2$, $H_2O$, and the like, which prevent the reaction with fluorine containing decomposition products of the PTFE. Thereby, the Raney alloy should have preferably a particle size in the range of 20 to 100 $\mu$m. so as to allow said enveloping action and to avoid a too intimate contact with the PTFE particles.

The use of said silver compounds has an additional advantage. The metallic silver produced on heating imparts to the obtained body a high electric conductivity, even though the Raney catalyst is present in the electrode only in a relatively small amount. This is particularly important when expensive catalysts, such as platinum or platinum alloys, are used; such catalysts present a sufficient catalytic activity already in small amounts which, however, alone would not suffice for the required conductivity of the electrode.

Generally, it is necessary to render fuel cell electrodes porous to have the used fuel contact the catalyst particles. It is known to produce such porosity by adding to the basic mixture soluble or vaporizable salts which are removed either during the heating operation (sintering) or during the subsequent leaching of the aluminum and leave cavities (pores). In the process of the invention, we found the use of readily volatized ammonium salts such as ammonium carbonate, of particular advantage. Hereby, the term ammonium carbonate is understood to encompass the compound $(NH_4)_2CO_3$ as well as the bicarbonate $(NH_4)HCO_3$ and also the carbamate $(NH_4)NH_2CO_2$, which salts are mostly present in commercial products anyhow. The development of the decomposition products $NH_3$ and $CO_2$ in addition to $H_2O$ provides apparently particularly well for the protecting gas effect, referred to hereinabove with respect to the silver carbonate.

The invention is illustrated by the following examples.

EXAMPLE 1

A mixture of the following powders was prepared:

| Component | Particle size in $\mu$m | g. | % by volume |
|---|---|---|---|
| Raney nickel ($NiAl_3$) | 40–80 | 1.46 | 25 |
| Silver carbonate | <5 | 2.72 | 30 |
| PTFE | 200–500 | 0.84 | 25 |

| | | | |
|---|---|---|---|
| Ammonium carbonate | <80 | 0.48 | 20 |

The powders were kneaded under strong pressure in a mortar until a scaly mass had been obtained. Said mass was then again disintegrated in a hammer mill to a loose powder. The powder was placed in a die of 48 mm. diameter and pressed with 36 mp. =2 mp./cm.$^2$. In the opened die, 3 g. of PTFE powder were spread onto the pressed body and pressed thereon under slight pressure (about 1 kp.). The obtained disc was removed from the die and heated in a hydrogen atmosphere first 3 hours at 190° C. (to decompose the carbonate), and then 2 hours at 350° C. (to sinter the PTFE). The disc was first placed in dilute (about 1 N) potassium hydroxide solution, which, at the end of the gas development, was heated up to 80° C.; there was obtained a hydrophobic anode for a fuel cell operating with hydrogen.

EXAMPLE 2

Similarly as in example 1, the following intimate powder mixtures were prepared:

| Component | g. | % by volume |
|---|---|---|
| a. catalyst layer | | |
| Raney-palladium-silver (PdAgAl$_4$; particle size 40–80 μm) | 4.7 | 20 |
| Silver carbonate | 8.1 | 30 |
| PTFE | 2.0 | 20 |
| Ammonium carbonate | 2.2 | 30 |
| b. stable support layer | | |
| Silver carbonate | 10.1 | 35 |
| PTFE | 3.2 | 30 |
| Ammonium carbonate | 2.7 | 35 |

A die of 90 mm. diameter was first filled with mixture (a), which was homogeneously distributed, and then mixture (b) was spread thereon. Then the mixtures were pressed under a pressure of 190 mp. =3 mp./cm.$^2$ and then subjected to a heat treatment and activation as described in example 1. The obtained electrode contained 20 mg./cm.$^2$ of palladium and was suitable as a fuel cell immersion electrode for the conversion of methanol, dissolved in a KOH electrolyte.

EXAMPLE 3

To prepare an oxygen (air) electrode, the procedure was similar to that of example 1 except that a Raney silver-platinum alloy of the composition $Ag_{0.99}Pt_{0.01}Al_3$ was used.

The composition of the active layer was

| | | |
|---|---|---|
| Raney alloy, particle size 40–80 μm | 4.0 g. | =20% by volume |
| Silver carbonate | 6.7 g. | =25% by volume |
| PTFE powder | 2.4 g. | =25% by volume |
| Ammonium oxalate, particle size μ40 μm | 2.9 g. | =30% by volume |

After the mixture had been compressed in a die of 90 mm. diameter under pressure of 190 mp. =3 mp./cm.$^2$ a layer of 12 g. of PTFE powder was placed thereon; then the mixture was sintered and activated as described in example 1. The mass contained only 0.6 mg./cm.$^2$ of platinum. Such an electrode can be operated without pressure, even with slight positive pressure on the electrolyte side (up to about 30 cm. $H_2O$) and is particularly suitable for operation with ambient air.

We claim:

1. A method for forming a fuel cell electrode comprising preparing a mixture of a powdered Raney alloy and polytetrafluoroethylene with a volume proportion at least equal to that of said Raney alloy of a powdered silver salt which is decomposed at a temperature not exceeding the sintering temperature of said polytetrafluoroethylene, the particles of said silver salt enveloping the particles of said Raney alloy, forming said mixture into an electrode structure, heating said structure in a nonoxidizing atmosphere within a temperature range and for a time sufficient to first decompose said powdered silver salt to metallic silver whereby evolved decomposition gases further envelop and protect the particles of said Raney alloy and to then sinter said polytetrafluoroethylene, and leaching out the soluble parts of said Raney alloy, thereby activating the electrode structure.

2. The method as claimed in claim 1 comprising adding to said mixture a powdered readily volatilized ammonium salt, said salt being volatilized from said structure during said heating step.

3. The method as claimed in claim 2 wherein said ammonium salt is an ammonium carbonate.

4. The method as claimed in claim 1 wherein said silver salt is silver carbonate.

5. The method as claimed in claim 1 wherein said silver salt has a particle size below about 10 μm.

6. The method as claimed in claim 1 wherein said Raney alloy has a particle size not smaller than about 20 μm. and not larger than about 100 μm.

* * * * *